US007588165B2

(12) United States Patent
Prichard et al.

(10) Patent No.: US 7,588,165 B2

(45) Date of Patent: Sep. 15, 2009

(54) DRUM TYPE VENDING MACHINE

(75) Inventors: James B. Prichard, O'Fallon, MO (US); Mark R. Henning, St. Charles, MO (US); Douglas M. Mingo, O'Fallon, MO (US)

(73) Assignee: Crane Co., Stamford, CT (US)

( * ) Notice: Subject to any disclaimer, the term of this patent is extended or adjusted under 35 U.S.C. 154(b) by 224 days.

(21) Appl. No.: 10/685,994

(22) Filed: Oct. 15, 2003

(65) Prior Publication Data

US 2004/0200853 A1 Oct. 14, 2004

Related U.S. Application Data

(60) Provisional application No. 60/419,039, filed on Oct. 15, 2002.

(51) Int. Cl.

| | |
|---|---|
| ***G07F 11/00*** | (2006.01) |
| ***A47F 1/00*** | (2006.01) |
| ***B65G 15/00*** | (2006.01) |
| ***B65G 17/00*** | (2006.01) |
| ***B65G 19/00*** | (2006.01) |

(52) U.S. Cl. ............................ 221/2; 221/76; 221/120; 221/121; 221/122; 221/242; 312/97.1; 312/125; 312/305

(58) Field of Classification Search .................. 221/69, 221/76, 120, 121, 122, 242, 133, 2, 4, 5, 221/12, 21, 75, 91, 129; 312/97.1, 125, 305

See application file for complete search history.

(56) References Cited

U.S. PATENT DOCUMENTS

| | | | | | |
|---|---|---|---|---|---|
| 2,104,497 | A * | 1/1938 | Schulte | 312/97.1 |
| 2,118,444 | A * | 5/1938 | Mueller | 211/131.1 |
| 3,538,863 | A * | 11/1970 | Howard et al. | 108/94 |
| 3,685,664 | A * | 8/1972 | Kramer | 211/131.1 |
| 4,049,154 | A * | 9/1977 | Burks | 221/76 |
| 4,049,330 | A * | 9/1977 | Schlapp | 312/186 |
| 4,317,604 | A * | 3/1982 | Krakauer | 312/97.1 |
| 4,453,326 | A * | 6/1984 | Hoffman et al. | 40/377 |
| 4,498,603 | A * | 2/1985 | Wittenborg | 221/76 |
| 5,285,926 | A * | 2/1994 | Falk et al. | 221/2 |
| 5,313,393 | A * | 5/1994 | Varley et al. | 705/28 |
| 5,360,134 | A | 11/1994 | Falk et al. | |
| 5,524,775 | A * | 6/1996 | Kaine | 211/131.1 |
| 6,068,158 | A * | 5/2000 | Chabout | 221/113 |
| 6,367,895 | B1 * | 4/2002 | Huffman et al. | 312/97.1 |

* cited by examiner

*Primary Examiner*—Gene Crawford
*Assistant Examiner*—Rakesh Kumar

(57) ABSTRACT

Trays within a given level of a drum-type vending machine form individual zones, and may be further subdivided into additional individual zones, for which pricing may be separately specified. A vend door for the corresponding level is constrained to allow access to a given zone upon payment of the appropriate amount. More levels and greater flexibility in pricing and product selection are thus enabled, together with greater control over vending operations.

8 Claims, 6 Drawing Sheets

DRUM TYPE VENDING MACHINE

This utility application claims priority to U.S. Provisional Patent Application No. 60/419,039 entitled "DRUM TYPE VENDING MACHINE" and filed Oct. 15, 2002. The content of the above-identified application is hereby incorporated by reference.

TECHNICAL FIELD OF THE INVENTION

The present invention is directed, in general, to vending mechanisms and, more specifically, to vending machines employing a rotating drum.

BACKGROUND OF THE INVENTION

Vending machines (or, equivalently, "merchandising systems") are often employed to deliver food, such as sandwiches, fruit or other items, in environments having limited access to alternative food service establishments or not warranting the expense of one or more food service attendants, either continually or during "off-peak" periods. Such environments include sites too remote from off-site food service establishments or work environments in which different shifts (e.g., a night shift) coincide with periods of limited availability of open food service establishments.

Some vending machines employ a vertical barrel or drum containing a number of essentially circular horizontal trays for holding food products, all maintained at the same temperature. The potential customer is generally able to rotate the drum to view various products. After payment and item selection, the customer is allowed access only to the item selected through a vend door located at the appropriate layer.

Drum-type vending machines are typically limited to only about three zones (e.g., horizontal levels) or less, and normally do not permit differentiation of price for product within a given zone. Thus, for example, all items on a given level must typically be sold for the same price. Conventional drum-type vending machines thus lack adaptability in offering different types of food products and in accepting price programming for different items within a given zone. These constraints limit the amount and type of products that a vendor may place in a single machine, and may require the vendor to operate multiple machines at a given site, decreasing customer selection while increasing operating costs.

There is, therefore, a need in the art for improved flexibility of product placement and pricing for drum-type vending machines.

SUMMARY OF THE INVENTION

To address the above-discussed deficiencies of the prior art, it is a primary object of the present invention to provide, for use in a drum-type vending machine, trays mounted within a given level of the drum to form individual zones, which may be further subdivided into additional individual zones, for which pricing may be separately specified. A vend door for the corresponding level is constrained to allow access to a given zone upon payment of the appropriate amount. More levels and greater flexibility in pricing and product selection are thus enabled, together with greater control over vending operations.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 10B, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
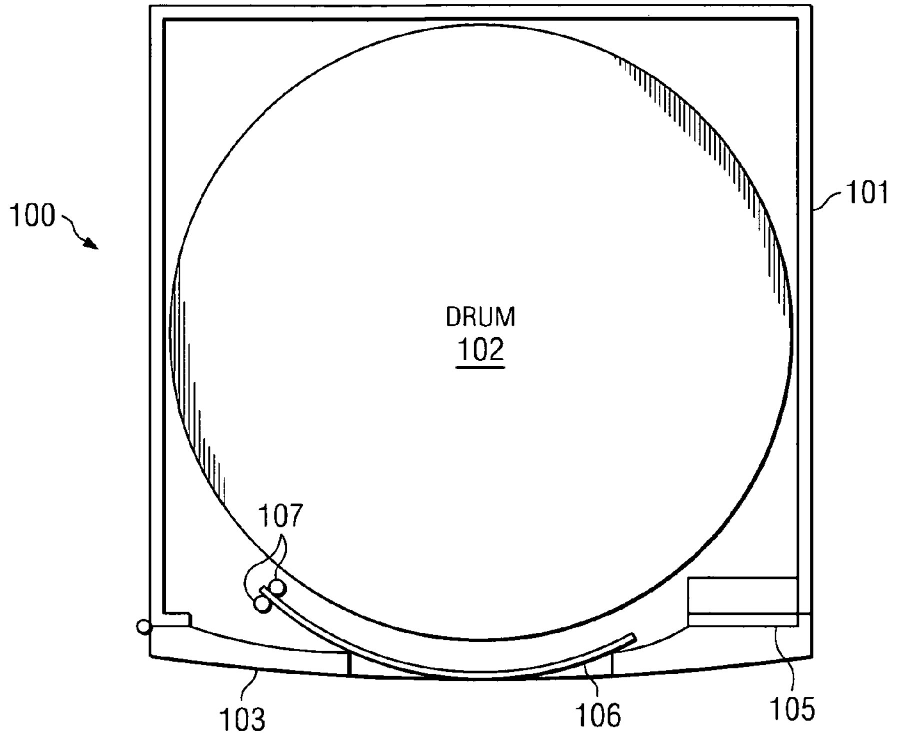
FIG. 1 depicts a simplified plan view for a drum-type vending machine according to one embodiment of the present invention.
Figure 2:
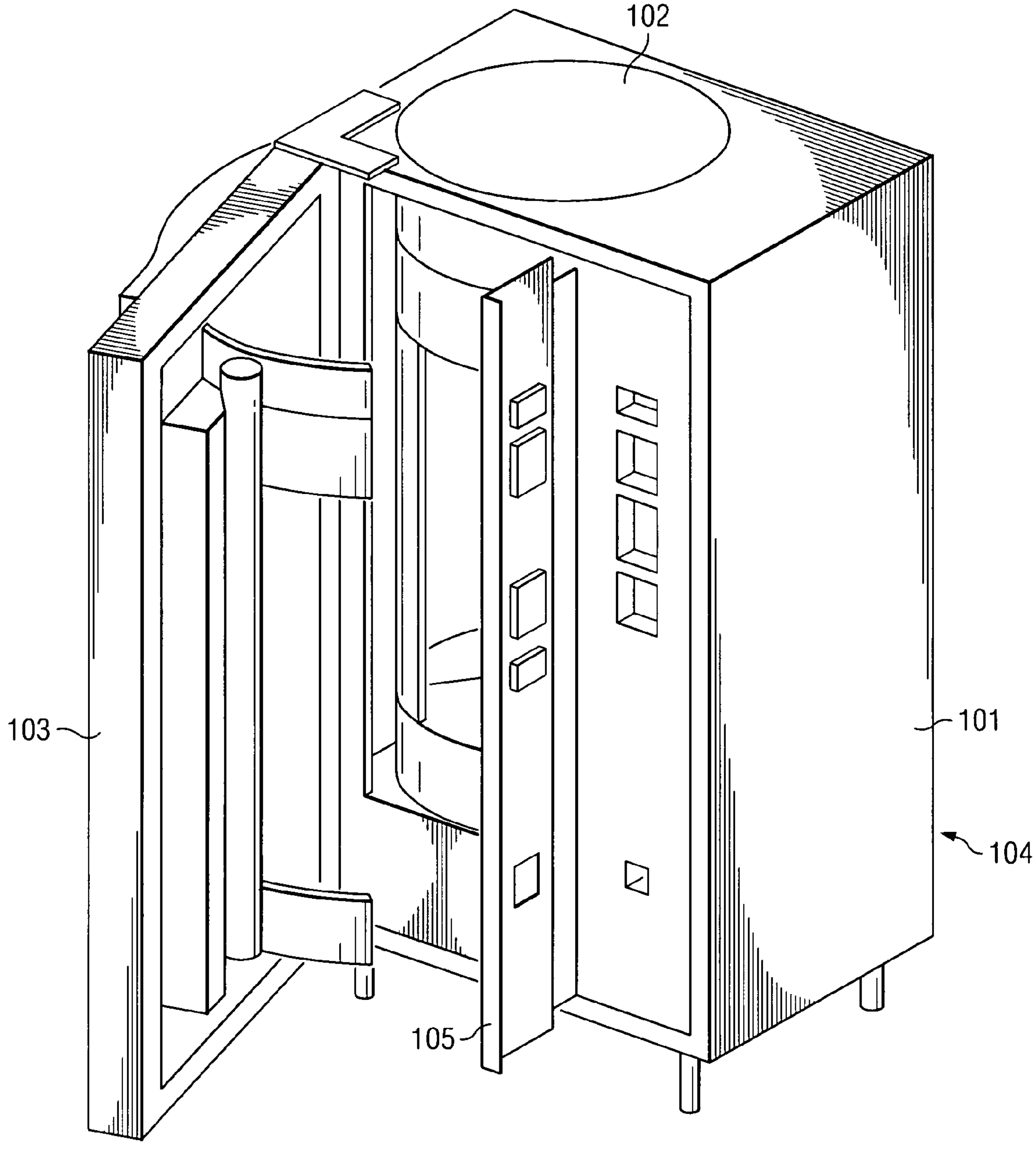
FIG. 2 depicts an isometric view of a drum-type vending machine according to one embodiment of the present invention.

FIG. 1 depicts a simplified plan view for a drum-type vending machine according to one embodiment of the present invention, while FIG. 2 depicts an isometric view of the same vending machine. Vending machine 100 includes a cabinet 101 containing a turret or drum 102 having a number of trays as described below, preferably enclosed within a separate portion of cabinet 101 that is refrigerated. Cabinet 101 also includes a drum access door or panel 103, which in the exemplary embodiment is hinged to swing open under key-controlled access to expose trays within the drum 102. A semi-modular cooling system 104 is at the back of cabinet 101 and/or mounted below the drum 102, with an evaporator (not shown) extending up into the refrigerated portion of the cabinet while the condensing unit and compressor (also not shown) are separate from the refrigerated compartment containing drum 102 with only a single point of access thereto. A money access panel 105 is depicted in the example shown as disposed within the drum access door 103 when closed.

Drum access door 103 includes a number of transparent vend doors 106 mounted therein as described in further detail below. Opening or closing of each vend door 106 is electronically controlled by servo-operated rollers 107 or an equivalent drive mechanism, such as connection to a belt-driven linkage. In the example illustrated, vend doors 106 are curved, and open and close by translation along an arcuate path. In alternative embodiments, vend doors 106 may be essentially flat, and open and close by translation along a linear path.

Those skilled in the art will recognize that the complete construction and operation of a vending machine is not depicted in the drawings or described herein. Instead, for simplicity and clarity, only so much of the construction and operation of a vending machine as is unique to the present invention or necessary for an understanding of the present invention is depicted and described.

Figure 3:
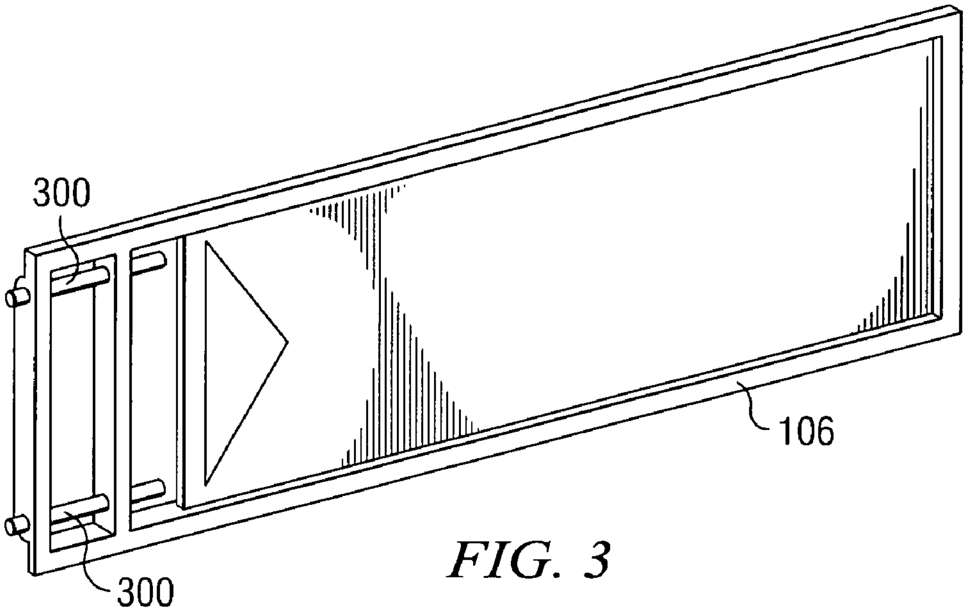
FIG. 3 depicts a vend door for a drum-type vending machine according to one embodiment of the present invention.

FIG. 3 depicts a vend door for a drum-type vending machine according to one embodiment of the present invention. Vend door 106 is formed of transparent plastic in the example shown, and includes electrical contacts 300 for connection to a source of electrical power. Contacts 300 are also connected to heater elements (not visible in the drawing), such as fine wires embedded within the transparent material of the vend door 106 or transparent conductive material formed and patterned on an outer surface of vend door 106. These heater elements, when powered, heat the vend door 106 to limit condensation on the outer surface of the vend door 106.

Figure 4:
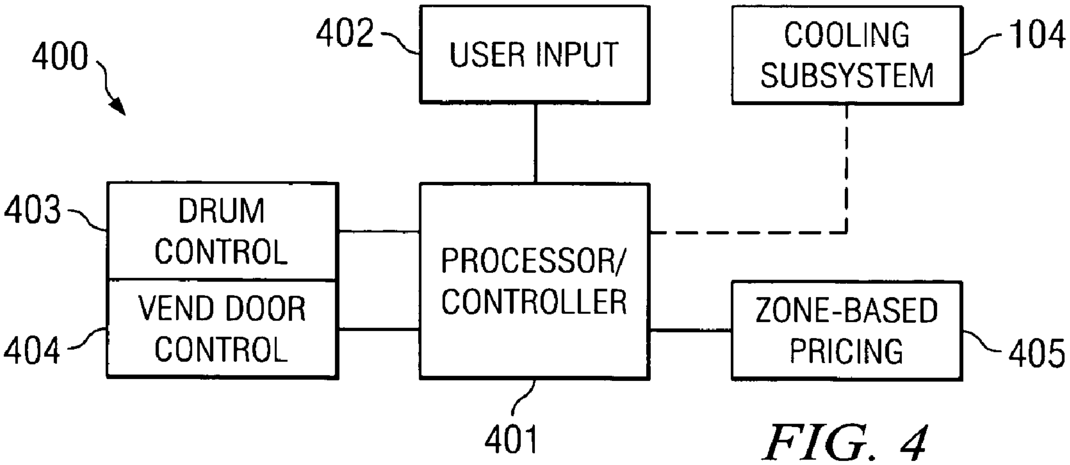
FIG. 4 is a block diagram of a control system for a drum-type vending machine according to one embodiment of the present invention.

FIG. 4 is a block diagram of a control system for a drum-type vending machine according to one embodiment of the present invention. Control system 400 includes a processor or programmable controller 401 coupled to a user input mechanism 402, typically including a payment mechanism (e.g., coin acceptor and bill validator), a plurality of buttons for controlling the drum or individual levels therein (as described in further detail below), and one or more item selection buttons.

Processor/controller 401 is also coupled to a drum control mechanism 403 for controlling rotation of the drum 102 or individual levels therein. Drum control mechanism 403 may include sensors for detecting the position of individual levels therein. Processor 401 is further coupled to a vend door control mechanism 404 for controlling opening and closing of vend doors 106, also described in further detail below.

Processor/controller 401 may optionally be coupled to semi-modular cooling subsystem 104, including temperature sensors, condensation sensors, and a control mechanism for the heater elements on vend doors 106, to at least partially control environmental conditions within and relating to the cabinet 101. Alternatively, the environmental control may be performed entirely independently of processor 401.

Figure 5A:
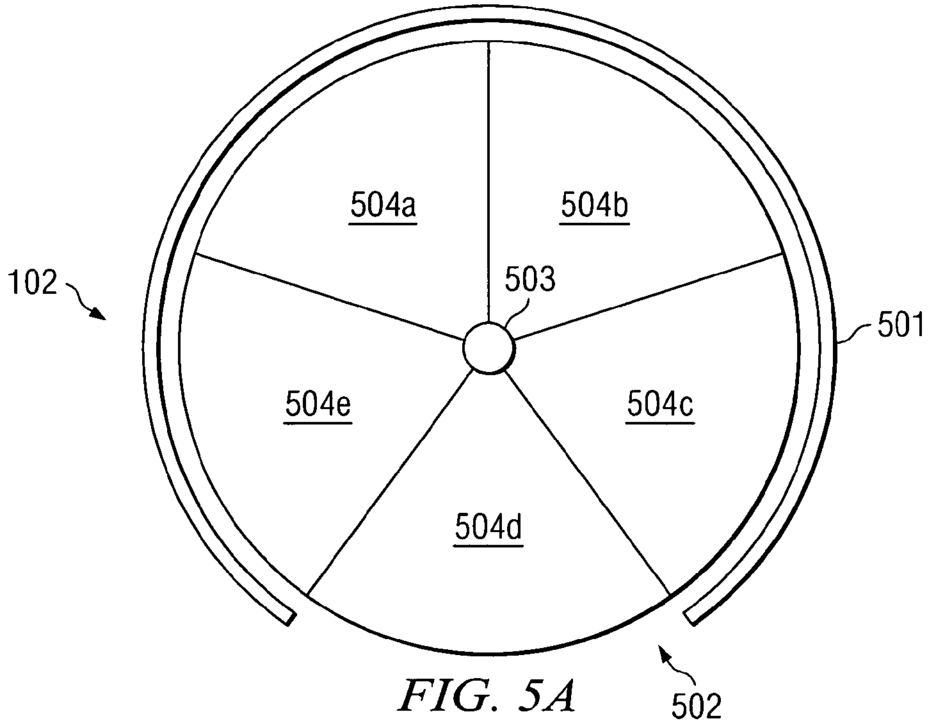
FIGS. 5A and 5B are simplified diagrams illustrating construction of a drum and individual levels and zones therein for a drum-type vending machine according to one embodiment of the present invention.
Figure 5B:
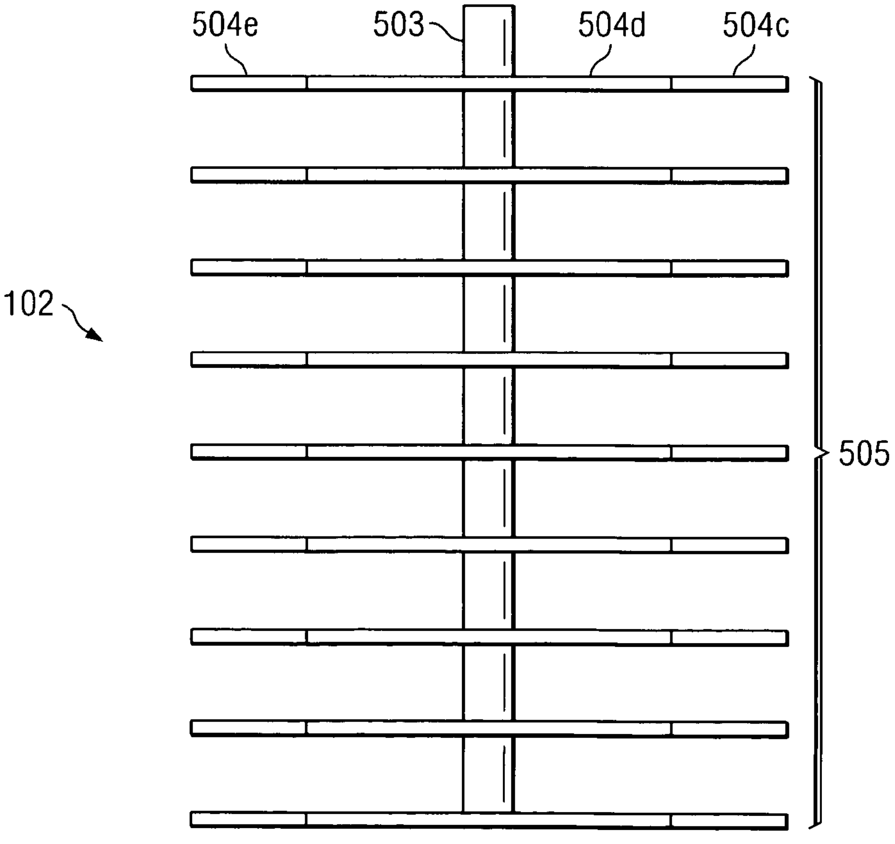

FIGS. 5A and 5B are simplified diagrams illustrating construction of a drum and individual levels and zones therein for a drum-type vending machine according to one embodiment of the present invention. FIG. 5A is a cross-sectional plan view that depicts an enclosure 501 having a generally circular cross-section, with an opening 502 on one side. Within enclosure 501 is a center support member 503 to which are affixed a plurality of trays 504*a*-405*e* for each level. As shown in FIG. 5B (without enclosure 501), trays 504*a*-504*e* are used to form nine identical levels 505.

In the exemplary embodiment, nine levels are formed by trays 504*a*-504*e*, each separated from adjacent levels or layers by a spacing of at least about five inches (a distance sufficient for an upright soft-drink can) While a different number of layers may be employed, at least more than six levels is preferable to provide greater vend capacity than conventional drum-type systems, which generally have six or fewer levels.

In the exemplary embodiment, each level includes five trays 504*a*-504*e* each occupying 72° of the circular space within drum 102, and is sized to hold at least a nine inch platter. Each tray defines at least one zone for a given level as described in further detail below. Due to subdivision of the trays, one-to-one correspondence between the number of trays and the number of zones within a given level may not exist.

The opening 502 is sized to correspond to the arcuate outer edge of an individual tray 504. Each level has a separate vend door providing access through the opening 502 to the contents within a particular tray aligned within opening 502 for that level, or to a subdivided space within that specific tray. The vend doors may be opened and closed by direct drive power door motors with gear racks integral to the drum access door as described in U.S. Pat. No. 5,375,737.

Figure 6:
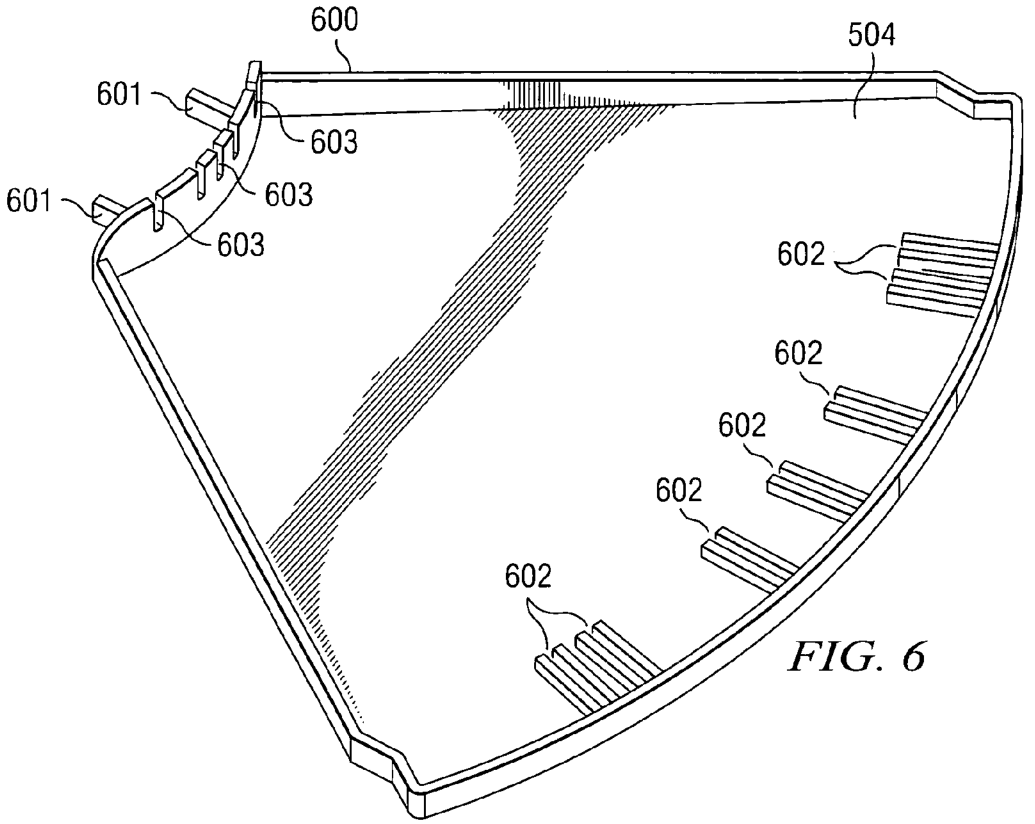
FIG. 6 depicts an individual tray for use within a drum for a drum-type vending machine according to one embodiment of the present invention.

FIG. 6 depicts an individual tray for use within a drum for a drum-type vending machine according to one embodiment of the present invention. Tray 504 has a peripheral lip 600 allowing the tray to hold approximately 4 to 13 ounces of spilled liquid. Tray 504 also includes mounting supports 601 for removably mounting tray 504 on center support member 503, as well as raised guides 602 and slots 603 for receiving a tray subdivider. Tray 504 may optionally have sidewalls (not shown) along the radial edge connecting the inner support that abuts the center support member 503 when mounted to the outer arcuate edge, serving a function similar to subdividers as described below.

Figure 7A:
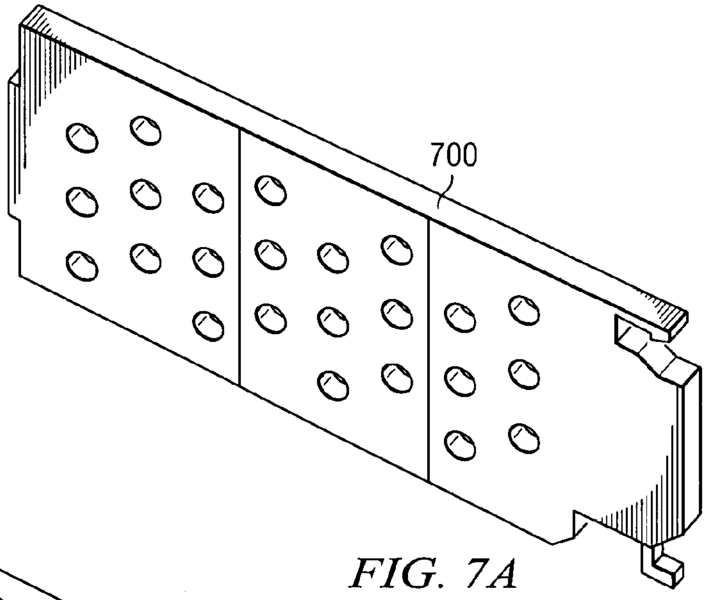
FIGS. 7A and 7B depicts a tray subdivider and locking mechanism for use with a tray within a drum for a drum-type vending machine according to one embodiment of the present invention.
Figure 7B:
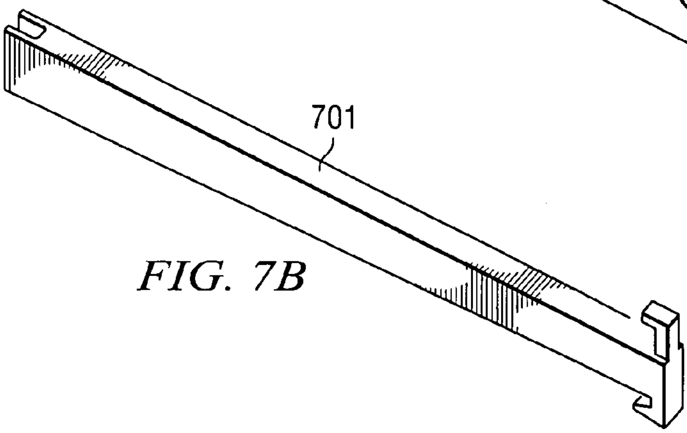
Figure 8:
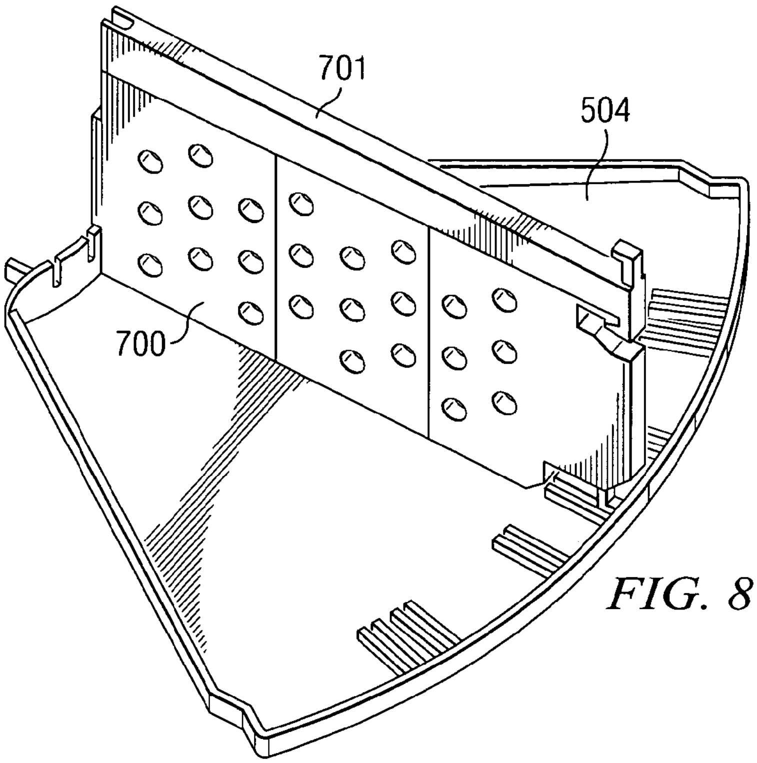
FIG. 8 depicts an assembled tray, subdivider and locking mechanism as used within a drum for a drum-type vending machine according to one embodiment of the present invention.
Figure 9:
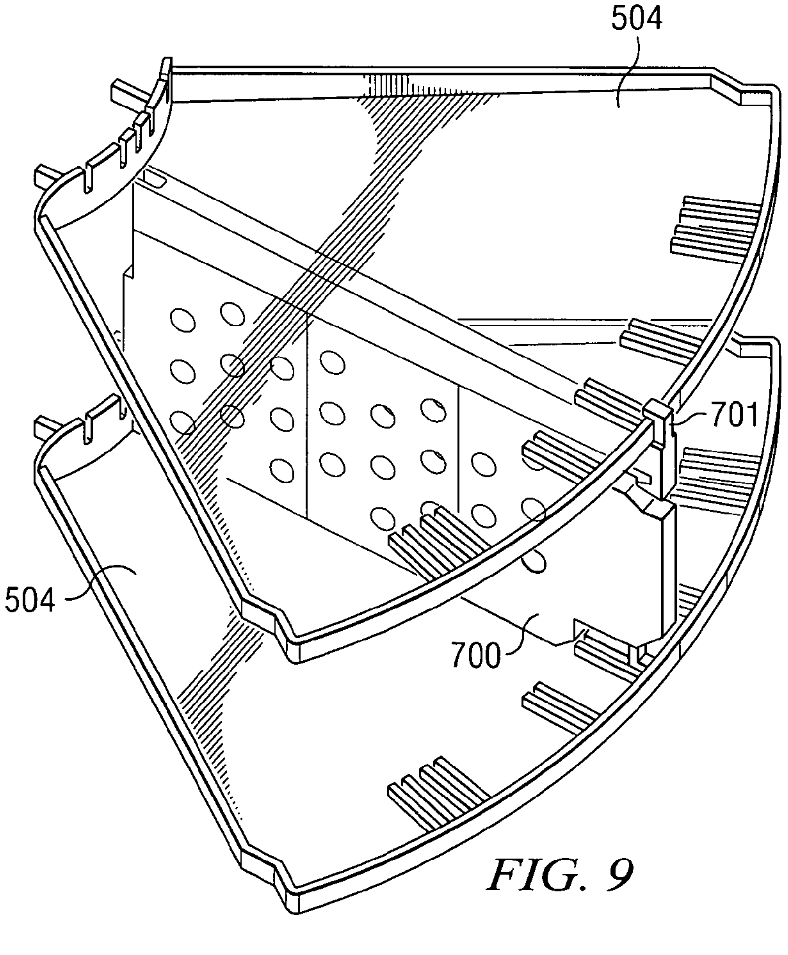
FIG. 9 depicts assembly of trays for two different levels together with a subdivider and locking mechanism as used within a drum for a drum-type vending machine according to one embodiment of the present invention.

FIGS. 7A and 7B depicts a tray subdivider and locking mechanism for use with a tray within a drum for a drum-type vending machine according to one embodiment of the present invention. FIG. 8 depicts an assembled tray, subdivider and locking mechanism, while FIG. 9 depicts assembly of trays for two different levels together with a subdivider and locking mechanism, both as used within a drum for a drum-type vending machine according to one embodiment of the present invention.

Subdivider 700, which in the example shown includes holes to permit air flow therethrough to limit temperature differences within the drum 501, are employed to increase the number of individual products that may be located on a single tray 504 within a drum-type vending machine, thus creating additional zones. Subdivider 700 is received by guides 602 and slots 603 within a tray. Locking mechanism 701 couples an upper edge of subdivider 700 disposed within one tray 504 to a tray immediately above the subdivider 700, within the next higher level. When assembled as shown in FIG. 9 (where the trays, subdivider and locking mechanism are all formed of transparent plastic), subdivider 700 and locking mechanism 701, together with the upper and lower trays to which those members are attached, effectively form two separate compartments for a given tray 504.

Subdivider 700 may extend beyond the radial outer distance of a tray 504 from support member 503, with the protruding portion serving to catch the vend door for the corresponding level during opening of that vend door (with sufficient force to merely cause the servos operating the vend door to shut off), and thereby prevent access to more than one subdivision for the tray 504. In this manner, subdivider 700 establishes door limits, such that separate or additional door stops are not required.

Figure 10A:
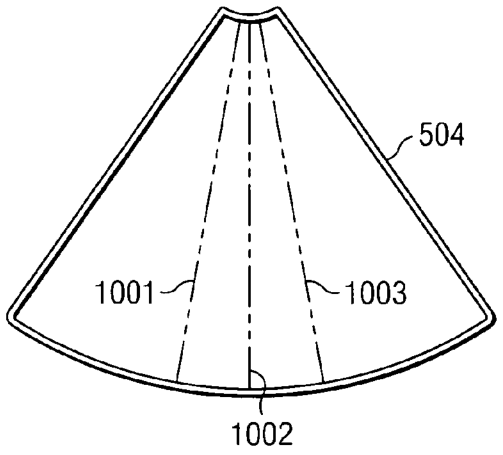
FIGS. 10A and 10B are simplified diagrams depicting alternative positions for a subdivider within a drum tray for a drum-type vending machine according to one embodiment of the present invention.
Figure 10B:
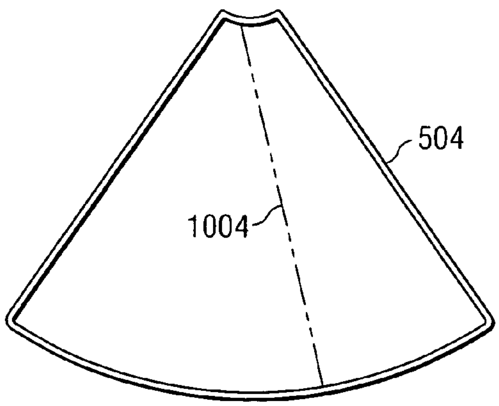

Trays 504, subdividers 700 and locking mechanisms 701 are all removable for ease in cleaning during restocking, and for repositioning of the subdividers. In the exemplary embodiment, subdividers may be positioned radially within a tray 504 in any of the three positions 1001-1003 (or any combination thereof) depicted in FIG. 10A, or may be positioned in an askew or "kicked" position 1004 that is not alone a radial line within the tray 504 as depicted in FIG. 10B. Still further, as reflected by the guides 602 and slots 603 depicted in FIG. 6. each tray 504 may be divided into five slots of equal size. The configuration of FIG. 10B allows the tray to be used to vend articles of different sizes and/or types, such as a sandwich and a can of soft drink.

Unlike conventional drum-type vending machines, in the present invention different trays in a given level may have different subdivisions. For example, one tray might be subdivided into two equally spaced regions, while a second tray is subdivided into three equally spaced regions and a third tray is subdivided into two unequally spaced (or asymmetric) regions. The trays, subdividers and locking mechanisms, or any combination thereof, may contain position sensors (e.g., magnetic indicators detecting by a drum position encoder) for use by drum control mechanism 403.

Subdividers 700 allow multiple zones to be created within a single tray 504. Thus, control system 400 includes a programmable memory 405 for storing zone-based pricing for a particular configuration of the vending machine 100. Unlike conventional systems, where all items on a given level must have the same price, the present invention allows different pricing to be associated with different trays on a given level, and with different subdivisions or slots on a given tray. The operator programs the number and location of zones for a given tray on a given level and the associated price(s) during initial configuration of the vending machine, or during restocking and reconfiguration. For the nine levels, five trays per level and up to five slots per tray in the exemplary embodiment, individual pricing for up to 225 items is supported, with full time-of-day. discount features, data recall features. etc. available for each slot individually. The pricing information may be electronically ndicated based on a zone aligned with the vend door at a given point in time.

During operation, a customer causes the drum 501 or a given level therein to rotate until the tray 504 or a tray subdivision is accessible when the vend door is opened—that is, aligned with a predetermined edge of the opening 502 in drum 501 (the edge from which vend door recedes during opening). Drum or level rotation is thus preferably controlled based on the subdivisions employed, such that, for example, a given level advances only one zone (tray or subdivision, as the case may be) at a time in response to the customer actuation of a rotate control. Upon appropriate payment, the vend door is opened to provide access only to the corresponding zone (tray or subdivision).

As noted above, the vend door for a given level may be powered, in which case positioning of dividers within individual trays and/or subdivisions may cause the vend door to be opened a different amount, depending on the subdivisions employed for a given tray. The vend door servos may simply be programmed to stop once a preselected amount of force preventing further opening of the vend door (corresponding to the door stop function of the subdivider protrusion) is encountered. If the vend door is manually operated, the subdivider protrusion precludes access to any zones other than that for which payment has been received.

Separate pricing for individual zones (trays or subdivisions within a tray) on a given level provides vending flexibility permitting the vendor to offer customers greater selection. Combined with a greater number of levels, such flexibility allows lower operating costs and/or higher vend rates.

In addition, the present invention allows greater flexibility and control over vending operations. For example, products within level or set of zones may be selectively restricted or "locked out" during selected periods. Thus, for example, stock might be reserved for vending only during a night shift, or access to food items prevented after an expiration date and/or time associated therewith. The zones may also be useful in tracking sales, setting prices, and for other vending operation control purposes.

Although the present invention has been described in detail, those skilled in the art will understand that various changes, substitutions, variations, enhancements, nuances; gradations, lesser forms, alterations, revisions, improvements and knock-offs of the invention disclosed herein may be made without departing from the spirit and scope of the invention in its broadest form.

What is claimed is:

1. A merchandising system comprising:

a center support member;

a plurality of trays each including one or more mounting supports for mounting the tray on the center support member within a vending machine, each tray adapted to be divided into a plurality of tray zones by one or more tray subdividers and each tray including at least one of a slot or a guide selectively receiving a tray subdivider separating one tray zone from another, each tray mounted on the center support member at one of a plurality of different levels, each tray adapted to be divided into a plurality of tray zones and including at least one of a slot or a guide selectively receiving a tray subdivider separating one tray zone from another; and a plurality of vend doors each disposed proximate to an outer edge of one or more of the plurality of trays at a corresponding one of the plurality of different levels, each vend door associated with a different level and each vend door separately selectively movable between an open position and a closed position, wherein each vend door, when in the open position, permits access to only one tray zone on a corresponding tray at the corresponding level, a catch on a tray subdivider received by the corresponding tray controlling a distance that the respective vend door moves between the open and closed positions based upon a size of a tray zone positioned proximate to an edge of the respective vend door;

an enclosure having an opening within at least a sidewall, wherein each vend door is positioned over a portion of the opening when in the closed position;

a motor for rotating the center support member; and controls that, when actuated, rotate the center support member to position a selected tray zone proximate to the vend door for corresponding tray.

2. The merchandising system according to claim 1, wherein each tray includes a plurality of slots, a plurality of guides, or both selectively receiving a plurality of tray subdividers separating at least three zones on the respective tray.

3. The merchandising system according to claim 1, wherein the tray zones are of unequal sizes.

4. A method of operating a merchandising system comprising:

providing at least one tray including one or more mounting supports for mounting the tray on a center support member within a vending machine, the tray adapted for division into a plurality of tray zones, the tray having a periphery defined by a first portion having first and second ends and abutting the support along an entire length between the first and second ends when mounted, a second portion distal from the first portion, a third portion extending between the first end of the first portion and the second portion and a fourth portion extending between the second end of the first portion and the second portion; and separating one tray zone from another with a radially askew tray subdivider extending from the first portion to the second portion;

mounting the at least one tray on the center support member;

selectively moving a vend door disposed proximate to an outer edge of the at least one tray between a closed position and an open position, wherein the vend door, when in the open position, permits access to only one tray zone; and controlling a distance that the vend door moves between the open and closed positions based upon a tray subdivider defining a tray zone positioned proximate to an edge of the vend door.

5. The method according to claim 4, further comprising:

separating at least three zones on the tray with a plurality of tray subdividers selectively received by a plurality of slots, a plurality of guides, or both on the tray.

6. The method according to claim 4, further comprising:

separating the tray into tray zones of unequal sizes.

7. The method according to claim 4, further comprising:

mounting a plurality of trays, including the at least one tray, on the center support member, wherein five trays are mounted at each level of nine levels spaced approximately five inches apart;

selectively rotating the center support member to position any selected tray zone on any of the plurality trays proximate to the vend door so that the selected tray zone is accessible when the vend door is in the open position and associating prices individually with each tray zone on each tray at each level.

8. The method according to claim 4, further comprising:

moving the vend door a first distance between the open and closed positions when a first fly zone is positioned proximate to the vend door; and moving a second distance between the open and closed positions when a second fly zone is positioned proximate to the vend door.

* * * * *